(12) United States Patent
Fraser et al.

(10) Patent No.: US 8,263,706 B2
(45) Date of Patent: Sep. 11, 2012

(54) ACRYLIC BLENDS

(75) Inventors: Ian Fraser, Yarm (GB); Ian Robinson, Guisborough (GB)

(73) Assignee: Lucite International UK Limited, Hampshire (GB)

( * ) Notice: Subject to any disclaimer, the term of this patent is extended or adjusted under 35 U.S.C. 154(b) by 480 days.

(21) Appl. No.: 11/919,213

(22) PCT Filed: Apr. 18, 2006

(86) PCT No.: PCT/GB2006/001393
§ 371 (c)(1),
(2), (4) Date: Oct. 25, 2007

(87) PCT Pub. No.: WO2006/114576
PCT Pub. Date: Nov. 2, 2006

(65) Prior Publication Data
US 2008/0255295 A1 Oct. 16, 2008

(30) Foreign Application Priority Data
Apr. 25, 2005 (GB) .................................. 0508255.7

(51) Int. Cl.
*C08F 8/00* (2006.01)
(52) U.S. Cl. ....... 525/191; 525/280; 525/55; 525/326.1; 525/330.3
(58) Field of Classification Search ............. 523/201
See application file for complete search history.

(56) References Cited

U.S. PATENT DOCUMENTS

| | | | | |
|---|---|---|---|---|
| 3,632,366 A | * | 1/1972 | Hiraga et al. ................. | 427/221 |
| 3,867,481 A | * | 2/1975 | Whang ......................... | 525/229 |
| 5,306,775 A | | 4/1994 | Martin et al. | |
| 5,319,029 A | | 6/1994 | Martin et al. | |
| 5,344,891 A | * | 9/1994 | Kawabata et al. ......... | 525/327.1 |
| 5,380,803 A | | 1/1995 | Coutant et al. | |
| 5,625,006 A | | 4/1997 | Callahan, Jr. et al. | |
| 5,777,034 A | | 7/1998 | Shah et al. | |
| 6,031,047 A | | 2/2000 | Brady et al. | |
| 6,172,135 B1 | * | 1/2001 | Fraser et al. ................. | 523/201 |
| 6,388,017 B1 | | 5/2002 | McDaniel et al. | |
| 6,696,513 B1 | * | 2/2004 | Welton et al. ................ | 524/405 |
| 2004/0132552 A1 | | 7/2004 | Chen | |

FOREIGN PATENT DOCUMENTS

| | | |
|---|---|---|
| AU | 200066877 * | 1/2001 |
| CN | 1335872 A | 2/2002 |
| DE | 199 27 769 A1 | 12/2000 |
| EP | 0 144 140 A2 | 6/1985 |
| EP | 0 588 147 A1 | 3/1994 |
| EP | 0781808 A2 | 7/1997 |
| EP | 0850740 A1 | 7/1998 |
| EP | 1 013 713 A1 | 6/2000 |
| EP | 1189987 | 12/2000 |
| FR | 2 749 591 A3 | 12/1997 |
| GB | 2278609 A | 12/1994 |
| JP | 54-23539 A | 2/1979 |
| JP | 56-008476 A | 1/1981 |
| JP | 07-174133 A | 7/1995 |
| JP | 7-174189 A | 7/1995 |
| JP | 9-208789 A | 8/1997 |
| JP | 9-216985 A | 8/1997 |
| JP | 10-259286 A | 9/1998 |
| JP | 2003-503531 A | 1/2003 |
| JP | 2006-124608 A | 5/2006 |
| WO | WO 86/05503 A | 9/1986 |
| WO | WO 96/37531 A1 | 11/1996 |
| WO | WO 00/78863 A2 | 12/2000 |

OTHER PUBLICATIONS

Odian ("Principles of Polymerization," 3rd ed., John Wiley & Sons: New York 1991, pp. 83-87).*
Hwang & Cho (Dept Chem Eng) "Effect of chain entanglement on bulk strength of glassy polymer, 1999".
Deely et al., "Melt Rheology and its Role in Plastics Processing: Theory and Applications," Van Nostran Reinhold: New York, pp. 441-490, 1990.
Cogswell, FN, "Polymer Melt Rheology, Appendix 9," Woodhead Publishing, pp. 156-157, 1981.
Wu, Souheng, "Chain structure and entanglement," Journal of Polymer Science Part B: Polymer Physics, vol. 27, No. 4, pp. 723-741, Mar. 11, 2003.
Larson et al., "Definitions of entanglement spacing and time constants in the tube model," Journal of Rheology, vol. 47, No. 3, pp. 809-818, May 2003.
Gordon, et al., "Computer programs for rheologists," Hanser Publishers (Munich), pp. 96-125, 1994.
Rauwendaal, "Polymer Extrusion," Hanser Publishers, Munich (ISBN 3-446-17960-7), pp. 322-323, 1994.
Office Action issued by the Australian Patent Office on Jan. 25, 2012.
Office Action issued by the State Intellectual Property Office of the People's Republic of China on Feb. 13, 2012 English Translation.
Office Action issued by the Japanese Patent Office on Sep. 20, 2011, English Translation.

* cited by examiner

*Primary Examiner* — Doris Lee
(74) *Attorney, Agent, or Firm* — Venable LLP; Keith G. Haddaway; Michael E. Nelson

(57) ABSTRACT

An acrylic polymeric composition comprising a melt blend of a thermoplastic high molecular weight acrylic material (HMWA) and a thermoplastic low molecular weight acrylic material (LMWA) is described. At least 70% w/w of the HMWA and the LMWA comprises an alkyl (alk)acrylate (co)polymer. The HMWA has a weight average molecular weight (Mw) of between 40 k Daltons and 1000 k Daltons and the LMWA has a weight average molecular weight (Mw) of between the entanglement molecular weight (Me) (expressed in k Daltons) and 250 k Daltons. A method of producing an acrylic polymeric composition and the use of an acrylic polymeric composition are described together with thick section molded products.

52 Claims, 4 Drawing Sheets

ACRYLIC BLENDS

Figure 1:
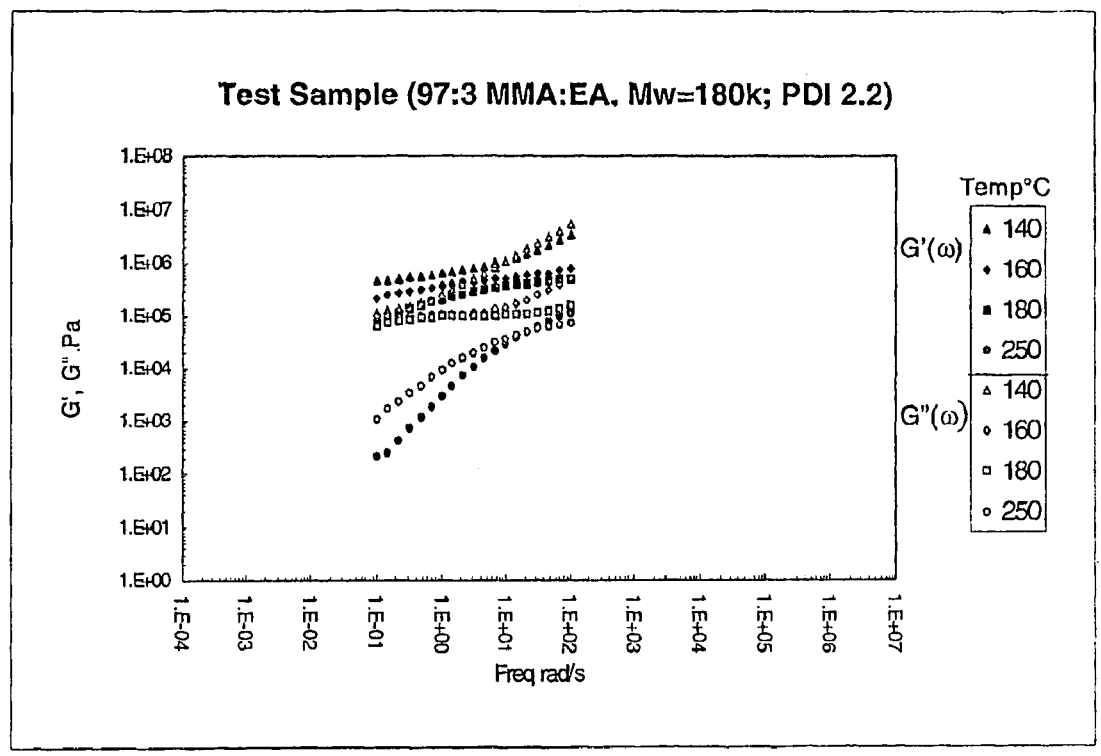
Figure 2:
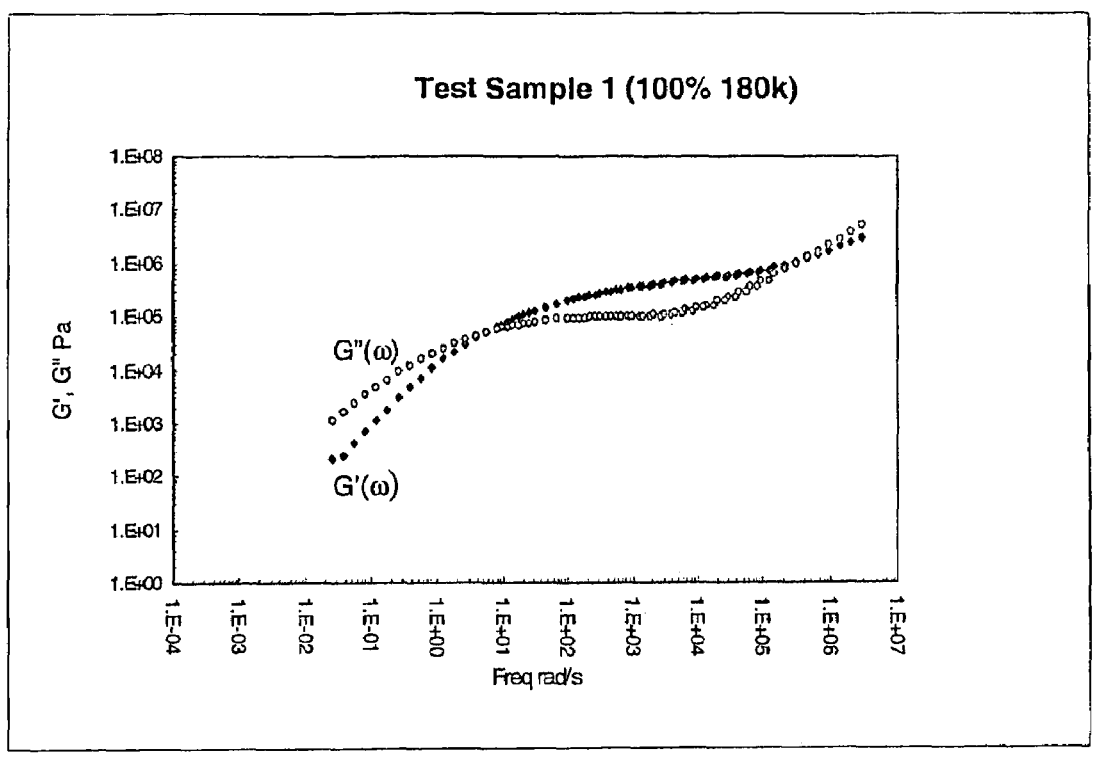
Figure 3:
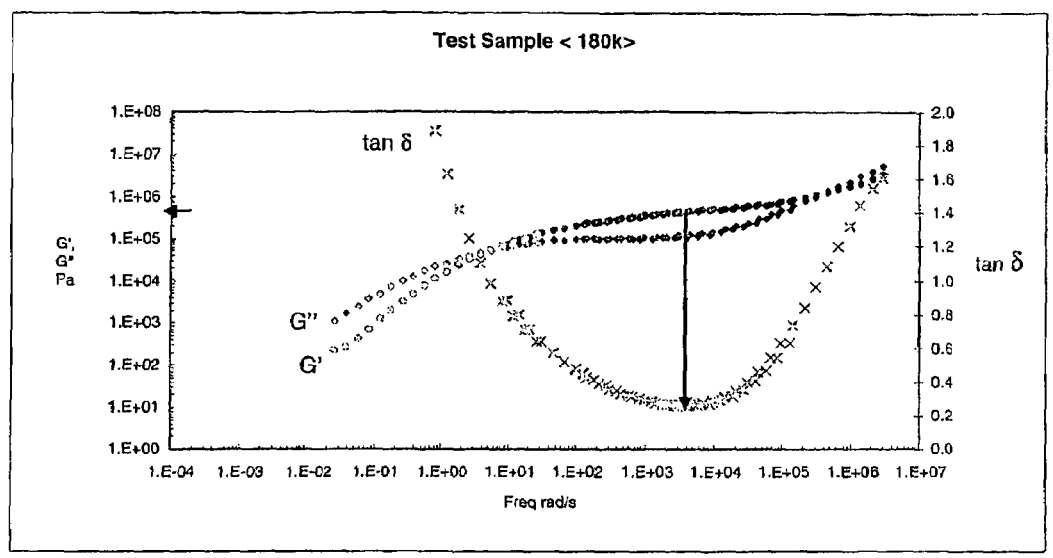

The present invention relates to acrylic blends, more specifically blends of low molecular weight acrylic polymers with high molecular weight acrylic polymers.

Improving the processability of acrylic polymers for various applications is an important area of research with many commercial benefits. Processability of polymers can generally be improved by increasing the melt flow index (MFI) and in the acrylics industry this has been effected by adding various copolymers such as alkyl acrylates or methacrylic acid to a high molecular weight PMMA polymer. Although increases of MFI can be achieved in this manner they also result in significant reduction in the glass transition temperature of the PMMA polymer with the consequent restriction in its range of applications such as those requiring moderate to high temperature resistance.

EP 0588147 describes a two stage blending process mainly for use with polyolefins. The use of the two stage blending process is to remove fish eye problems in the final product. Specific molecular weights are not provided.

Hwang and Cho, Department of Chemical Engineering, Pohang University, in an internet disclosure entitled "Effect of chain entanglement on the bulk strength of glass polymer" report determination of critical chain entanglement density using fracture toughness estimates. They concluded that use of low MW PMMA adversely affected fracture energy of the polymer.

WO 086/05503 describes mixtures of high and low molecular weight alkyl acrylates which are produced from the same monomer. Alkyl(alk)acrylates are mentioned only as co-monomer components of a high or low molecular weight copolymer. The document relates to the use of these mixtures for pressure sensitive adhesives.

JP 56-008476 describes a pressure sensitive adhesive composition made by mixing (A) low mol. wt. acrylic such as PMMA and (B) an acrylic polymer. The composition is claimed to provide improved adhesion to roughened surfaces.

JP 07-174133 discloses low and high mol. wt. blends including alkyl(alk)acrylates as the high molecular weight component. The high mol. wt. content is less than the low mol. wt. content. The utility of the blends is in relation to low hardness rolls. The low molecular weight additive can be selected from:
Softeners
Plasticizers
Tackifiers
Oligomers
Or Lubricants JP 07-174189 discloses a similar system to that in JP 07-174133 but applies it to improving vibration damping performance.

JP 54-23539 describes a toner with a colouring agent, an acrylic copolymer and optionally vinyl polymer. The copolymer preferably comprises (a) methacrylates such as methyl methacrylate, (b) vinyl monomer and (c) glycidyl methacrylate (2,3 epoxypropyl methacrylate).

EP 0144140 discloses a blend for mixing with bentonite as a drilling mud. The blend comprises a low molecular wt. water soluble non-ionic or anionic polymer and a high molecular wt. anionic polymer. The low mol. wt. component is below about 50K (page 2 line 31) and the high mol. wt. component is above about 500K. Acrylic acid polymers are given as examples of the low mol. wt. components (page 2 line 18) having mol. wt. up to 40K. Low alkyl ($C_{1-4}$) acrylates are given as general examples and acrylic acid and methacrylic acid are given specifically. The presence of acid groups may assist solubility. Alkyl(alk)acrylate blends are not disclosed.

EP 1189987 B1 mentions that a particular set of properties including desirable Vicat softening can be achieved using cross-linked poly(meth)acrylate based impact modified high molecular weight acrylic polymers blended with lower molecular weight acrylic polymers.

U.S. Pat. No. 6,388,017 relates to a process of contacting a narrow mol. wt. distribution ethylene base polymer with a high mol. wt. such that there is 0.1%→10% by wt. of molecules with mol. wt. >1 million. Blending is mentioned as a possible route although copolymerisation is preferred.

U.S. Pat. No. 5,306,775, U.S. Pat. No. 5,319,029 and U.S. Pat. No. 5,380,803 disclose high and low mol. wt. polyolefine blends to improve crack resistance, clarity, etc.

FR 2749591 discloses a cleaning composition for plastic processing equipment. There are two PMMA components:
(a) 95%-25% w/w of a high mol. wt. non-thermoplastic pmma component; and
(b) 5-75% w/w of a thermoplastic PMMA.

In the description, the term high mol. wt. is defined as "an average mol. wt. of more than 500[K], preferably more than 1,000[K] daltons . . . ".

Similarly, the description defines the term "thermoplastic [PMMA] . . . to mean a [PMMA] having an average mol. wt. of 50[K] to 200[K] . . . ." The non-thermoplastic PMMA is likely to remain as a solid during the cleaning process.

According to a first aspect of the present invention there is provided an acrylic polymeric composition comprising a melt blend of a thermoplastic high molecular weight acrylic material (HMWA) and a thermoplastic low molecular weight acrylic material (LMWA), at least 70% w/w, based on the total weight of the HMWA, of the said HMWA comprising an alkyl (alk)acrylate (co)polymer, the said (co)polymer comprising at least 80% w/w of a first polymer derived from $C_1$-$C_{12}$ alkyl ($C_1$-$C_8$ alk)acrylate monomer units and optionally, up to 20% w/w, based on the said alkyl alk)acrylate (co)polymer of a first copolymer derived from $C_1$-$C_{12}$ alkyl ($C_0$-$C_8$ alk)acrylate and/or ($C_0$-$C_8$ alk)acrylic acid monomer units, the said HMWA having a weight average molecular weight of between 40 k Daltons and 1000 k Daltons, at least 70% w/w, based on the total weight of the LMWA, of the said LMWA comprising an alkyl(alk)acrylate (co)polymer, the said (co)polymer comprising at least 80% w/w of a second polymer derived from $C_1$-$C_{12}$ alkyl ($C_1$-$C_8$ alk)acrylate monomer units and optionally, up to 20% w/w, based on the said alkyl(alk)acrylate (co)polymer of a second copolymer derived from $C_1$-$C_{12}$ alkyl($C_0$-$C_8$ alk)acrylate and/or ($C_0$-$C_8$ alk)acrylic acid monomer units, the said LMWA having a weight average molecular weight of between the entanglement molecular weight ($M_e$) (expressed in k Daltons) and 250 k Daltons, with the proviso that the HMWA has a higher Mw than the LMWA.

Preferably, the first polymer of the HMWA and the second polymer of the LMWA are the same ie. if the first polymer is methyl(meth)acrylate, the second polymer is methyl(meth) acrylate, etc. Likewise, preferably, the first copolymer and the second copolymer are the same ie. if the first copolymer is ethyl acrylate the second copolymer is ethyl acrylate etc. Preferably, the ratio of the first polymer: first copolymer is within ±30% of the ratio of second polymer: second copolymer, more preferably within ±20%, most preferably within ±10%.

Preferably, the weight ratio of HMWA:LMWA in the composition is greater than 1:1, more preferably, at least 6:5, most preferably, at least 7:3.

Preferably, the acrylic polymeric composition comprises, based on the weight of the acrylic polymeric composition, up to 55% w/w of LMWA and at least 40% w/w of HMWA, more preferably, up to 15% w/w of LMWA and at least 50% w/w of HMWA, most preferably, up to 10% w/w of LMWA and at least 60% w/w of HMWA material.

By melt blend is meant a composition which has been produced by the method of melt blending. By melt blending is meant a method of melt mixing that reduces the nonuniformity of a binary (or greater) composition of different polymers (including polymers which only differ from each other in respect of their molecular weight). The mechanism of mixing is to induce physical motion of the ingredients at an elevated temperature (preferably, T>glass transition, Tg, for all polymer components). This involves ensuring sufficient distributive and dispersive mixing to enable the constituents in the blend to be regarded as homogeneous. This consequently requires the polymers to undergo convective mixing by laminar flow for a sufficiently long enough time such that the residence time for the polymers in the mixing process exceeds the time to achieve homogenisation by that process. (Preferably, good practice would ensure that the size and shape of the polymer components to be mixed will be broadly similar, thus aiding dispersive mixing). Suitable mixing procedures may include single or twin screw extrusion, or through the screw feed process in injection moulding.

Such a definition would preclude the use of blending via pressure only (even if the temperature were raised greatly above the glass transition) or blending via solution mixing and eventual evaporation (C Rauwendaal Polymer Extrusion Hanser Publishers, Munich (1994) ISBN 3-446-17960-7; page 322 & J M Deely and K F Wissbrun Melt Rheology and its role in plastics processing, Theory and Applications Van Nostran Reinhold, New York (1990) ISBN 0-442-22099-5; page 480).

References to $M_e$ herein should be taken to be determined by torsional melt rheology characterisation Such characterisation is carried out according to ASTM D4440. Specifically $M_e$ should be assumed to be determined for a sample of polymer as follows:
prior to mounting in the torsional rheometer, solid pre-form disks are prepared and dried in a vacuum oven overnight at 70° C., to remove residual moisture. They are then mounted in between parallel plates of 25 mm diameter, in a Rheometrics RDAII rotational rheometer.

The upper test fixture is lowered so it touches the bottom fixture at approximately the same normal force it experiences during testing. The gap indicator is then zeroed. The upper test fixture is then raised and the sample disk is placed on to the bottom test fixture.

The plate is gently lowered down onto the surface of the disk, and then heated to a temperature of typically 140° C., whilst maintaining the gap setting for a sample disk of 2 mm thickness. Once the polymer disk has visibly melted, the excess polymer sample emerging from the side of the cone and plate is trimmed off, using a sharp knife. Torsional frequencies between 0.01 and 100 rads/s at a fixed strain amplitude of 5% are then applied to the sample by the rheometer at this fixed temperature. During this frequency sweep, the storage (elastic) modulus $G'(\omega)$ and the loss (viscous) modulus $G''(\omega)$ are determined at each frequency.

The temperature of the melt is then increased to a value typically 20-30° C. higher than previously, with the experimental procedure being repeated. Measurements were normally made at 230° C., up to a maximum temperature of typically 250° C.

The measurement of the storage and loss moduli allows the calculation of the complex viscosity $\eta^*(\omega)$ using the standard relationship (ref LA Utraki Polymer Alloys and Blends, p134 Hanser Publishers (1990)):—

$$\eta^*(\omega) = \frac{\sqrt{G'^2(\omega) + G''^2(\omega)}}{\omega} \qquad [4a]$$

The storage and loss moduli were then subjected to time temperature superposition to a reference temperature of 230° C. using the Shiftt.exe computer program, described conceptually and with source code listing by GV Gordon and MT Shaw Computer Programs for Rheologists, Hanser Publishers (1994).

The resulting 'master curves' were shifted to a reference temperature of 230° C., assuming a glass transition temperature of approximately 100° C., using either tan δ ($G'(\omega)/G'$ ( )) or the storage modulus $G'(\omega)$ as the reference spectra to be superposed.

FIGS. [1-3] below give an example of basic rheological data for a test sample before and after superposition to the master curve.

FIG. [1]: Torsional rheology data for a Test Sample measured between 0.01 and 100 Hz and between 140 to 250° C.

FIG. [2]: Torsional rheology data in the form of a 'master curve' for the Test Sample, superposed to 230° C. This shows the full rheological spectrum for this polymer between frequencies of $10^{-2}$ to $10^7$ rad/s.

Determination of entanglement molecular weight from master curves

The entanglement molecular weight is related to the plateau shear modulus, determined from data such as shown in FIG. (2), according to the relationship $$M_e = k \frac{\rho RT}{G_N^0} \qquad [8]$$

Where ρ is the density of a polymer at temperature T. The values for PMMA polymer at specific temperatures are found in FN Cogswell Polymer Melt Rheology Appendix 9 p156, Woodhead Publishing Ltd 1997), $G°_N$ is the plateau modulus and R is the gas constant (8.3144 J mol$^{-1}$ K$^{-1}$) and k is a constant, whose value is 4/5 (definitions of entanglement spacing and time constants in the tube model R G Larson et al Journal of Rheology 47 p809 (2003)).

The plateau modulus can be obtained from a master curve as the value of the storage modulus $G'(\omega)$ of where tan δ reaches a local minimum (See S Wu 'Chain Structure and entanglements' Journal of Polymer Science:Pt B Polymer Physics 27 p723 (1989))

$$G_N^0 = G'(\omega)|_{\omega \to \tan \delta = min} \qquad [9]$$

Thus taking the data in FIG. (2) and plotting the tan δ function allows the identification of $G°_N$ FIG. [3] Plateau modulus $G°_N$ calculated from $G'(\omega)$ at min tan δ(=$G''(\omega)/G'(\omega)$) using the dataset in FIG. [2]. $G°_N$ by this definition is 0.46 MPa.

Preferably, the compositions of the present invention are thermoplastic and are not thermosetting compositions. Preferably, the melt blends are homogenous melt blends.

The composition may optionally include a second or further HMWA component (defined in the same manner as the first HMWA above) which has a weight average molecular weight greater than the LMWA but which may be less or greater than the other HMWA component(s). This second or further component may be present at a level, based on the acrylic polymeric composition, of at least 5% w/w, more preferably, at least 10% w/w, most preferably, at least 15% w/w. Preferably, the said second or further HMWA has a lower weight average molecular weight than the first HMWA component. Otherwise, the second or further HMWA may include any of the preferred features of the first HMWA including any relative relationship to the LMWA such as those of the nature and proportion of the third polymer and copolymer with respect to the LMWA second polymer and copolymer.

In addition, preferably, the first polymer of the HMWA and the third or further polymer of the second or further HMWA are the same. Preferably, the first copolymer and third copolymer are the same. Preferably, the ratio of the first polymer: first copolymer is within ±30% of the ratio of the third polymer: third copolymer, more preferably, within ±20%, most preferably within ±10%.

The HMWA (including the second or further HMWA component when present) may be present, based on the overall weight of the acrylic polymeric composition, at a level of up to 99% w/w, more preferably, up to 96% w/w, most preferably, up to 94% w/w.

The LMWA may be present, based on the overall weight of the acrylic polymeric composition, at a level of at least 1% w/w, more preferably at least 2% w/w, most preferably at least 4% w/w.

The LMWA may be present, based on the overall weight of the acrylic polymer composition, in the range of 1-60% w/w, more preferably 2-55% w/w, most preferably 4-51% w/w, especially 4-40% w/w, more especially 4-30% w/w.

The HMWA (including the second or further HMWA component when present) may be present, based on the overall weight of the acrylic polymeric composition, in the range of 99-40% w/w, more preferably 98-49% w/w, most preferably, 98-70% w/w, especially 98-45% w/w, more especially 96-49% w/w, most especially 96-60% w/w or 96-70% w/w.

The HMWA and LMWA may together form 90% w/w, more preferably, 95% w/w, most preferably, 99% w/w, especially, substantially 100% w/w of the acrylic monomer derived components of the acrylic polymeric composition.

Preferably, the LMWA has a weight average molecular weight (Mw) in excess of 11K Daltons, more preferably in excess of 15 k Daltons, most preferably, in excess of 20K Daltons.

In some embodiments it may be in excess of 50 k or even 70 k.

Preferably, the LMWA has a Mw less than 150K, more preferably, less than 70K, most preferably, less than 65K. An especially preferred Mw for the LMWA is less than 40 k, even especially preferred is less than 25 k.

The upper limits and lower limits as herein defined for LMWA Mw and HMWA Mw may be combined in any respective combination.

Preferably, the HMWA has a Mw in excess of 50K Daltons, more preferably, in excess of 70K Daltons, most preferably, in excess of 85K Daltons.

The HMWA first component may have a Mw in excess of 100K, more preferably, 120K, most preferably, 140K, whereas the HMWA second or further component may have a Mw in excess of 50 k, more preferably in excess of 60 k, most preferably in excess of 70K.

Preferably, the $C_1$-$C_{12}$ alkyl($C_0$-$C_8$ alk)acrylate and/or ($C_0$-$C_8$ alk)acrylic acid first or second copolymer, when present, comprises up to 15% w/w of the alkyl(alk)acrylate copolymer, more preferably up to 10% w/w, most preferably, up to 8% w/w. The first or second copolymer may be $C_1$-$C_{12}$ alkyl ($C_0$-$C_8$ alk)acrylate polymer or a ($C_0$-$C_8$ alk)acrylic acid or a combination thereof and may be present at independent levels in the LMWA or the HMWA. Preferably, more than 80% w/w of the HMWA or the LMWA is the relevant alkyl(alk)acrylate (co)polymer, more preferably, more than 90% w/w, most preferably, more than 95% w/w of the LMWA or HMWA is the said relevant (co)polymer.

Preferably, the HMWA and the LMWA together form more than 80% w/w of the acrylic polymeric composition, more preferably, at least 90% w/w of the acrylic polymeric composition, most preferably, at least 95% w/w, especially 99% or 100% w/w of the acrylic polymeric composition.

The balance of the acrylic polymeric composition and/or HMWA and/or LMWA may consist of suitable additives, preferably, non acrylic additives. Preferably, the additives form less than 30% w/w, more preferably, less than 20% w/w, most preferably less than 10% w/w and especially less than 5% of the said composition and/or the HMWA and/or LMWA.

The additives may include thermal stabilisers, UV stabilisers, colouring agents, gloss control agents, diffusion agents, fire retardants and lubricants. Preferably, the additives do not include cross-linking agents. Preferably, the acrylates used in the present invention do not include functional groups capable of effecting substantial cross-linking in the composition or in further compositions comprising the composition. Preferably, any acrylic acid units having free hydroxyl groups present in the composition do not act as a cross linking agent or are not present in sufficient amount to effect substantial crosslinking. In particular, the compositions of the present invention preferably do not include substantive levels of non-acrylic or vinyl monomer units in the polymer chains (other than those vinyl monomer units derived from acrylic monomers). Preferably, "acrylic monomers" or the like as used herein do not include any or substantive (for instance, greater than 1%) levels of acrylonitrile monomers but do include substituted or unsubstituted $C_1$-$C_{12}$ alkyl ($C_0$-$C_8$ alk) acrylate monomers and ($C_0$-$C_8$ alk) acrylic acid monomers. Preferably, the substituted acrylic monomers or the like do not include any (or, if so, do not have a substantive level in the monomers) substituents capable of effecting crosslinking with the same or a different substituent on an acrylic monomer unit of a neighbouring or the same polymer chain. In particular, the acrylic monomer units of the polymers and copolymers of the present invention do not include any substantive level of monomer units with glycidyl or hydroxyl (other than (alk) acrylic acid) group substituents. By substantive as used above is meant less than 5% w/w in the HMWA or LMWA, more preferably, less than 1% w/w, most preferably, less than 0.1%, especially, less than 0.01% w/w, more especially 0.001% w/w.

The acrylic polymeric composition may also form the base polymer of a further system, requiring a base polymer such as an impact modified polymer or a resin dissolved or dispersed in a solvent.

Accordingly, the invention extends in a second aspect to an acrylic composition comprising
 (a) an acrylic polymeric composition according to the first aspect of the present invention and
 (b) a suitable solvent.

Preferably, the solvent (b):polymer (a) ratio w/w in the said second aspect is between 10:90 and 60:40, more preferably, 20:80 and 50:50, most preferably between 30:70 and 45:55.

A suitable solvent is n butyl acetate.

The modification of cross-linked poly(meth)acrylate impact modified blends with a low molecular weight component is known at low levels of cross-linked poly(meth)acrylate. However, surprisingly, the inventors have discovered advantageous properties, for example, high Tg at much higher levels of impact modifiers.

Accordingly, in a third aspect, the invention extends to an impact modified acrylic polymer composition comprising
  (a) a base polymer in accordance with the acrylic polymeric composition of the first aspect of the present invention and
  (b) a core-shell impact modifier, preferably, having been blended therewith.

Preferably, the w/w ratio of (a):(b) in the third aspect is between 30:70 and 90:10, more preferably, between 40:60 and 80:20, most preferably between 50:50 and 70:30.

Particularly preferred levels of component (b) in the input modified acrylic polymer composition are in the range 7-50% w/w, more preferably 30-50% w/w, most preferably 32-40% w/w.

Suitable core-shell particles are discrete particles made by multi-stage graft copolymerisation normally by emulsion polymerisation techniques, each having a multi-layer structure and generally used to improve the impact resistance of polymers such as acrylic materials. A wide variety of these particles is available which differ in the type of copolymers from which they are made and the number and volume of shells present around the core. Typically the core is made from a methacrylate homo or copolymer and the first shell provides the rubbery material having a low Tg, typically made from an alkyl acrylate/styrene copolymer. This shell is often formulated to provide a rubbery character for impact modification whilst being matched in refractive index to the acrylic substrate into which it is to be incorporated. A preferred type of copolymer to form the shell is based on n-butyl acrylate and an aromatic comonomer, e.g. styrene or a derivative thereof. A second or subsequent shell may also be present. Many suitable core-shell particles are commercially available, e.g. IR441 available from Mitsubishi Rayon Co., and some commercially available grades of acrylic moulding materials include similar materials pre-compounded in to the polymer. One suitable core-shell particle is described in WO96/37531, the contents of which are incorporated by reference, and comprises a (meth)acrylic polymer core, a first shell comprising a low Tg polymer comprising 0-25% by weight of a styrenic monomer and 75-100% by weight of an acrylic monomer, the (meth)acrylic monomer being capable of forming a homopolymer having a Tg in the range −75 to −5° C., the first shell representing at least 65% by volume of the combined volume of the core and first shell, (as determined by transmission electron microscopy, to identify the shell by staining, and by assuming sphericity of the particles and using $4/3\,\pi\,r^3$ to determine the volume of the core and core/shell) and optionally a second shell which comprises a second (meth)acrylic polymer which may be the same as or different from the first (meth)acrylic polymer and the core and first shell together contain from 0.5-1.0% by weight of a graft cross-linker.

A suitable transmission electron microscopy technique and instrument is a Philips CM12 TEM.

The present invention is optionally directed to acrylic polymeric compositions which are substantially free of impact strength modifier derived from cross-linked poly(meth)acrylates either pre-blended in the high molecular weight component or otherwise combined therewith and, optionally, free of such impact strength modifier pre-blended in any of the components. In fact, in one embodiment a substantially impact modifier free acrylic polymer composition is envisaged. By substantially free is meant less than 1% w/w of acrylic polymeric composition of an impact strength modifier, more preferably less than 0.5% w/w, most preferably less than 0.1% w/w.

Advantageously, however, the addition of an impact modifier component when used in the present invention can be carried out in a one step process ie. the HMWA, the LMWA and the Impact Modifier component can be blended together in the appropriate quantities in a single melt blending step wherein they are introduced to the melt blending stage as separate components.

However, as an alternative, the impact modifier component can be pre-blended with the LMWA prior to melt blending the impact modified LMWA with the HMWA. The advantage of this approach is that the properties of the impact modified LMWA will have more in common with the HMWA and thereby be easier to process and melt blend therewith. By this route the optimal blending conditions such as temperature for each component are likely to be closer.

Therefore, according to a further aspect of the present invention there is provided a method of melt blending an impact modified acrylic polymer composition according to the third aspect of the invention comprising the steps of:—
melt blending the following separate components in a single melt blending step:—
a HMWA according to the first aspect of the present invention;
a LMWA according to the first aspect of the present invention; and a core-shell impact modifier.

As a still further alternative, the impact modifier can be blended with a pre-blended acrylic polymer composition of the first or any aspect of the invention. Advantageously, by this means, an acrylic polymeric composition of the invention can be impact modified after production.

For the avoidance of doubt, references to blending or melt blending herein optionally incorporate a tumble blending phase prior to the melt phase.

The HMWA and the LMWA are, preferably, simple single phase polymers, typically produced by the same polymerisation process. Prior to blending they may be in any suitable form for blending such as bead, pellet or granules.

Suitable processes for production of the HMWA or LMWA include bulk polymerisation and suspension polymerisation. Although, the HMWA and/or LMWA can be produced by emulsion polymerisation, it is preferably not so produced as the process introduces additional unnecessary steps into the process, may introduce non-single phase polymers and does not easily result in matched bead or granule sizes with a non-emulsion polymerised HMWA/LMWA.

Surprisingly, a polymeric melt blend in accordance with any of the aspects of the present invention has a much higher melt flow index (MFI) and comparable Tg when compared with the HMWA in isolation.

As the Tg is maintained at a comparable level to the HMWA the compositions can be used in a variety of similar applications but with improved processability due to the higher MFI. For instance, comparable processability can be maintained with reduced cycle times thus reducing the cost of production. Advantageously, the invention also provides processing advantages as high Tg blends require less processing time ie. cooling time during processing. Faster part cooling rates in the tool can therefore be achieved with the invention. Furthermore, structural integrity can be achieved at higher final part temperatures, effectively reducing the cooling cycle times. One application where this is advantageous is thick section moulding applications which require high melt flow polymers. Such high melt flow polymers can be de-moulded more quickly if the Tg of the polymer is higher.

Accordingly, the invention extends in another aspect to the use of the polymers of the invention in thick section moulding and de-moulding processes as well as to thick section moulds of compositions of the invention. By thick section moulds is meant an average thickness of the moulded product of between 3 mm and 100 mm, more preferably, between 5 mm and 50 mm, most preferably, between 5 mm and 20 mm. Especially preferred are sections in the range 5-10 mm. Thick section may also extend to products wherein any parts of the section are more than 3 mm from the nearest surface of the product, more preferably more than 4 mm, most preferably more than 5 mm, and especially greater than 6 mm. The invention also extends to thick section moulded polymer products produced from a composition according to any of the $1^{st}$, $2^{nd}$ and $3^{rd}$ aspects of the present invention.

Another advantage of the ability to increase MFI means that new polymers with unique properties can be produced. High Tg/high MFI polymers are particularly useful in heat exposure applications such as those of lighting fixtures.

Heat exposure applications are applications which may expose the final moulded product to temperatures in excess of 50° C., more typically, in excess of 70° C. Such polymer blends are therefore useful in providing enhanced design flexibility in lighting applications or other applications where the polymer is exposed to a nearby heat source.

Therefore, according to a fourth aspect of the present invention there is provided a moulded polymer product comprising an acrylic polymeric composition according to the first, second or third aspect of the present invention. The said moulded product may be injection moulded or extrusion moulded.

The increase in MFI should also provide a reduced viscosity in coating applications meaning that more polymer can be used without increasing viscosity or a reduced viscosity can be found with the same amount of polymer.

Accordingly, in a fifth aspect of the present invention, there is provided the use of an acrylic composition in accordance with any of the aspects of the present invention to provide a higher MFI melt blended composition or moulded polymer product (as compared with the HMWA not blended with the LMWA).

Preferably, the invention also provides a high Tg melt blended composition or moulded polymer product.

High Tg and/or higher MFI can be tested by the following method. The Tg and the MFI for the normal polymer is established by conventional means. For the avoidance of doubt, reference to MFI herein are references to MFI in grams/10 minutes determined at 230° C. with a weight of 3.8 kg in accordance with ASTM D1238-98, Procedure A.

The low molecular weight additives are blended into the normal polymer at such a level which preferably causes an increase in the melt flow index of the normal polymer, of for instance, 15 g/10 mins. If the Tg is measured for an MFI increase of 15 g/10 mins, it is experimentally found that the Tg will typically only suffer a decrease in the range of 1 to 15° C., more typically 2-12° C., most typically 4-10° C., via this route. Even with an increase in MFI of 25 g/10 mins, the Tg is typically only reduced by 1-20° C., more typically, 2-15° C., most typically 4-12° C. Preferably, for each MFI increase of 5 g/10 mins, the reduction in Tg is less than 5° C., typically this is the case up to very high MFIs, for example up to 35 g/10 mins, 40 or 45 g/10 mins.

This improvement distinguishes the invention from the alternative method for increasing the melt flow index by the same amount (e.g. 15 g/10 mins). This is done by keeping the molecular weight constant but increasing the level of acrylate comonomer used in the copolymer. This alternative strategy causes an increase in MFI of 15 g/10 mins at the expense of a suppression in the glass transition in the order of greater than 15° C.

Therefore, a high Tg may be taken as a Tg in a test (co) polymer of the invention which is higher than that for a comparative copolymer with the same MFI which is derived from the same type and equivalent amount of $C_1$-$C_{12}$ alkyl ($C_1$-$C_8$ alk) acrylate monomer(s) but a higher amount of $C_1$-$C_{12}$ alkyl acrylate monomer(s) to thereby give the MFI increase necessary and which is not a melt blended HMWA and LMWA in accordance with the invention wherein the "equivalent amount" of $C_1$-$C_{12}$ alkyl $C_1$-$C_8$ alk acrylate is the same amount reduced by the proportionate increase in the $C_1$-$C_{12}$ alkyl acrylate amount in the comparative copolymer, for example if the comparative copolymer comprises 5% w/w $C_1$-$C_{12}$ alkyl acrylate more than the test polymer, then the $C_1$-$C_{12}$ alkyl $C_1$-$C_8$ alk acrylate in the comparative copolymer is reduced by 5% w/w.

Preferably, at an MFI of the polymer blend between 30-50 g/10 min, the Tg is preferably between 80° C.-110° C., more preferably, 85° C.-110° C., most preferably, 90° C.-110° C.

References to Tg herein should be taken to be determined using DSC procedure ASTM E1356-98, extrapolated onset temperature on $2^{nd}$ reheat unless indicated otherwise.

According to a sixth aspect of the present invention there is provided a method of producing an acrylic polymeric composition comprising the steps of:— a) contacting a thermoplastic high molecular weight acrylic material (HMWA) with a thermoplastic low molecular weight acrylic material (LMWA); and b) mixing the said HMWA and LMWA at an elevated temperature until a melt blend is produced;

wherein the said elevated temperature is above the glass transition temperature of both the HMWA and LMWA.

Steps a) and b) may take place sequentially or simultaneously. Preferably, the acrylic polymer composition is in accordance with that defined by any of the other aspects of the present invention.

The melt blending may be carried out by extrusion or injection moulding techniques.

The invention will now be illustrated by the accompanying examples. FIG. 1 shows comparative results with equivalent amounts of alkyl acrylate and methacrylic acid additives. These results are also shown in table 1.

EXPERIMENTAL

Polymerisation

Polymer samples were made by conventional free radical suspension polymerisation, resulting in a bead polymer of a given chemical composition and molecular weight distribution. The bead polymers were dried in a vacuum oven overnight at 70° C., to remove all residual moisture.

Melt Blending

Blends of different homogenous molecular weight bead polymers were made by first weighing out a known quantity of each polymer using a pan balance. The correct amount of each polymer making up the blend composition were tumble mixed in a plastic bag for approximately five minutes to ensure thorough dispersion of the components. The tumble blended mixture were then placed in a fresh metal container and dried in a vacuum oven overnight at 70° C. to remove any residual moisture.

The dried tumble blended mixtures were consolidated into an extruded continuous melt stream through the use of a DSM micro extruder twin screw mixer (15 cm³ volume), heated in all zones at 230° C., (much higher than the glass transition at approximately 100° C.) with a screw rate of at least 60 rpm. Residence times through the extruder were chosen to ensure homogenisation of the melt stream. The polymer 'lace' was hauled off and mechanically fractured into chips approximately five mm in length using a conventional polymer processing shredding tool.

Description of MFI Test Method

The melt flow index measures the rate of extrusion of thermoplastics through a circular die at a prescribed temperature and fixed load. The amount of polymer which is extruded out under a set time is sampled, and the weight of the cooled extrudate is determined. From this the melt flow index is determined. It is simple method for measuring flow of a molten polymer, hence polymer processability at a fixed temperature.

Approximately 5-8 g of polymer is loaded into the barrel of the melt flow apparatus (Davenport 730A/77CR) which is heated to a specified temperature. A weight is then applied to the plunger which forces the molten polymer through the circular die. The test begins once the applied load forces the plunger past a scribed mark, and the test ends after a set time interval. The polymer which is extruded out of the die during this set time period, is allowed to cool and is weighed.

The test method and the apparatus used in the test is described in more detail in ASTM D1238—procedure A. The values used for the PMMA and blend samples in this test were
Temperature (10 mm above the die)=230° C.
Applied load=3.8 kg
Circular die diameter=2.0955+/−0.0051 mm
Test duration=10 minutes
Weight=grams
Flow Rates=grams/10 minutes Molecular Weight Determination Molecular weight, Mw, was characterised using size exclusion chromatography (also referred to as gel permeation chromatography, GPC), using a Polymer Laboratory Caliber system, with PMMA standards.

Calibration of the GPC required the following procedure.

PMMA standard solutions were made using 15 mg of either Mp 10.3 k or Mp 107 k dissolved in 10 ml chloroform containing 5-10 µl MMA marker. Approx 5 mg of each standard was placed into a vial, dissolved in 10 ml chloroform containing 5-8 µl of MMA flow marker, filtered and 1-2 ml transferred into autosampler vials for evaluation.

Test polymers were analysed as follows. 25-30 mg of polymer were weighed into a vial, and 10 ml chloroform was added. The mixture was agitated until dissolved. The samples were filtered through a 0.2 µm PTFE/syringe filter, without using excessive pressure before analysis.

The polymer sample was dissolved in the chloroform at a temperature of 30° C. The injection volume into the GPC was between 1 to 5 microliters. A flow rate of 1 ml/min was used. Determination of molecular weight, Mw, was performed automatically using the analytical software used by the instrument.

Molecular weights were measured in chloroform relative to PMMA standard using GPC equipment fitted with an infrared detector tuned to the carbonyl absorption at 5.90 microns.

Residual monomer levels were determined by reprocessing the raw data using LG/GC software. The GPC equipment and software were supplied by Polymer Laboratories Limited.

| Solvent | Chloroform |
| --- | --- |
| Flow rate | 1 ml min-1 |
| Sample concentration | 25 mg/10 ml |
| Temperature | 30° C. |
| PC | IBM Compatible |

Core Shell Volume Calculation

The specimens (of impact modified polymer) were trimmed to produce block faces for subsequent sectioning. They were then placed in a fresh solution of ruthenium trichloride in aqueous sodium hypochlorite. The resulting reaction produces ruthenium tetroxide and gives rise to preferential staining of any unsaturation present in the system. The stain gives enhanced contrast in the transmission electron microscope (TEM), thereby aiding interpretation. The blocks were soaked in the staining medium for one hour before being removed, washed with distilled water and allowed to dry at room temperature. After aligning in a Reichert Ultracut E ultramicrotome, approx 50 nm sections were taken and examined in a Philips CM12 TEM.

Glass Transition Characterisation

The glass transition Tg for each polymer were characterised using differential scanning calorimetry (DSC), using the procedure outlined in ASTM E1356-98. The Tg characterisation method used is the extrapolated onset temperature on second reheat.

The equipment used was a Mettler Toledo TC15 TA controller, with a circular pan geometry approximately 5 mm in diameter by 1 mm in depth, made from aluminium, with a nominal thickness of 15 µm. The samples were heated at a scan rate of 20° C./min. Measurements were made using nitrogen of purity >99.9%, and 50 ml/min as the flow rate. There were no indications of any side reactions during the glass transition measurement. After first heating the pan was cooled using liquid nitrogen before reheating using the previously described conditions.

Some samples (as indicated) were analysed for Tg using Heat Deflection Temperature (HDT) under a deformation of 1.82 MPa using ASTM D648.

| | Base Polymer 1 | Base Polymer 2 | Base Polymer 3 |
| --- | --- | --- | --- |
| Main Monomer | MMA | MMA | MMA |
| % w/w | 97 | 97 | 97 |
| Second Monomer | EA | EA | EA |
| % w/w | 3 | 3 | 3 |
| Mw (k) | 90 | 142 | 22.1 |
| Mn (k) | 41 | 67 | 9.4 |
| Product Form | Powder | Powder | Powder |
| Tg° (C.) via DSC | 106.7 | 110.3 | 96.3 |
| MFI(g/10 min) @230° C./3.8 kgf/ 2.095 mm die | 5.4 | 1.2 | Unmeasurable |

Base polymers 1-3 are used in blending examples below
Comparative Base Polymer Examples 4-8

| | Base Polymer 4 | Base Polymer 5 | Base Polymer 6 |
| --- | --- | --- | --- |
| Main Monomer | MMA | MMA | MMA |
| % w/w | 99 | 98.5 | 95 |
| Second Monomer | EA | EA | EA |
| % w/w | 1 | 1.5 | 5 |
| Mw (k) | 90 | 90 | 90 |

-continued

| | | | |
|---|---|---|---|
| Mn (k) | 45 | 45 | 45 |
| Product Form | Compound | Compound | Compound |
| Tg° (C.) via HDT | 100.4 | 98.5 | 92.8 |
| MFI(g/10 min) @230° C./3.8 kgf/ 2.095 mm die | 3.6 | 4.3 | 6.0 |

| | Base Polymer 7 | Base Polymer 8 |
|---|---|---|
| Main Monomer | MMA | MMA |
| % w/w | 90 | 86 |
| Second Monomer | EA | EA |
| % w/w | 10 | 14 |
| Mw (k) | 88 | 90 |
| Mn (k) | 41 | 45 |
| Product Form | Compound | Compound |
| Tg° (C.) via HDT | 82.8 | 75.9 |
| MFI(g/10 min) @230° C./3.8 kgf/ 2.095 mm die | 15.5 | 27.0 |

| | Compound 9 | Compound 10 | Compound 11 |
|---|---|---|---|
| Base Polymer | 1 | 1 | 1 |
| Parts | 95 | 90 | 85 |
| Base Polymer | 3 | 3 | 3 |
| Parts | 5 | 10 | 15 |
| Base Polymer | — | — | — |
| Parts | — | — | — |
| Mw (k) | 85.0 | 82.5 | 77.4 |
| Mn (k) | 32.8 | 31.9 | 29.1 |
| Product Form | Compound | Compound | Compound |
| Tg° (C.) via DSC | 106.1 | 104.2 | 102.4 |
| MFI(g/10 min) @230° C./3.8 kgf/ 2.095 mm die | 6.1 | 7.4 | 8.5 |
| Comments | Compound made from binary blend of base polymers (1 & 3) | Compound made from binary blend of base polymers (1 & 3) | Compound made from binary blend of base polymers (1 & 3) |

| | Compound 12 | Compound 13 | Compound 14 |
|---|---|---|---|
| Base Polymer | 1 | 2 | 2 |
| Parts | 50 | 50 | 33 |
| Base Polymer | 3 | 3 | 1 |
| Parts | 50 | 50 | 34 |
| Base Polymer | — | — | 3 |
| Parts | — | — | 33 |
| Mw (k) | 68.3 | 83.9 | 98.0 |
| Mn (k) | 22.9 | 21.1 | 30.4 |
| Product Form | Compound | Compound | Compound |
| Tg° (C.) via DSC | 105.1 | 100.7 | 104.7 |
| MFI(g/10 min) @230° C./3.8 kgf/ 2.095 mm die | 32.51 | 19.8 | 11.53 |
| Comments | Compound made from binary blend of base polymers (1 & 3) | Compound made from binary blend of base polymers (2 & 3) | Compound made from binary blend of base polymers (1, 2 & 3) |

| | Compound 15 | Compound 16 | Compound 17 |
|---|---|---|---|
| Base Polymer | 2 | 2 | 2 |
| Parts | 20 | 60 | 90 |
| Base Polymer | 1 | 1 | 3 |
| Parts | 60 | 20 | 10 |
| Base Polymer | 3 | 3 | — |
| Parts | 20 | 20 | — |
| Mw (k) | 82.3 | 97.2 | 115.6 |
| Mn (k) | 24.0 | 26.3 | 36.8 |
| Product Form | Compound | Compound | Compound |
| Tg° (C.) via DSC | 103.9 | 104.8 | 104.3 |
| MFI(g/10 min) @230° C./3.8 kgf/ 2.095 mm die | 9.14 | 4.35 | 1.82 |
| Comments | Compound made from ternary blend of base polymers (1, 2 & 3) | Compound made from ternary blend of base polymers (1, 2 & 3) | Compound made from ternary blend of base polymers (2 & 3) |

Example compound polymers 9-17 are binary or ternary blends of base polymers 1-3 and achieve enhanced melt flow without significantly reducing glass transition (as measured by DSC)

| | Compound 18 | Compound 19 |
|---|---|---|
| Base Polymer | 1 | 1 |
| Parts | 60 | 54 |
| Base Polymer | — | 3 |
| Parts | — | 6 |
| Impact Modifier | Yes | Yes |
| Parts | 40 | 40 |
| Mw (k) | 90 | 90 |
| Mn (k) | 41 | 41 |
| Product Form | Compound | Compound |
| Tg° (C.) via HDT | 67.3 | 68.0 |
| MFI(g/10 min) @230° C./3.8 kgf/ 2.095 mm die | 0.89 | 1.11 |
| Comments | Compound made from binary blend of base polymer 1 & impact modifier | Compound made from ternary blend of base polymers 1 & 3 & impact modifier |

Example compound polymers 19 is an impact modified binary blend of base polymers 1 & 3 and achieves enhanced melt flow without significantly reducing glass transition (as measured by DSC), compared to example 18.

Figure 4:
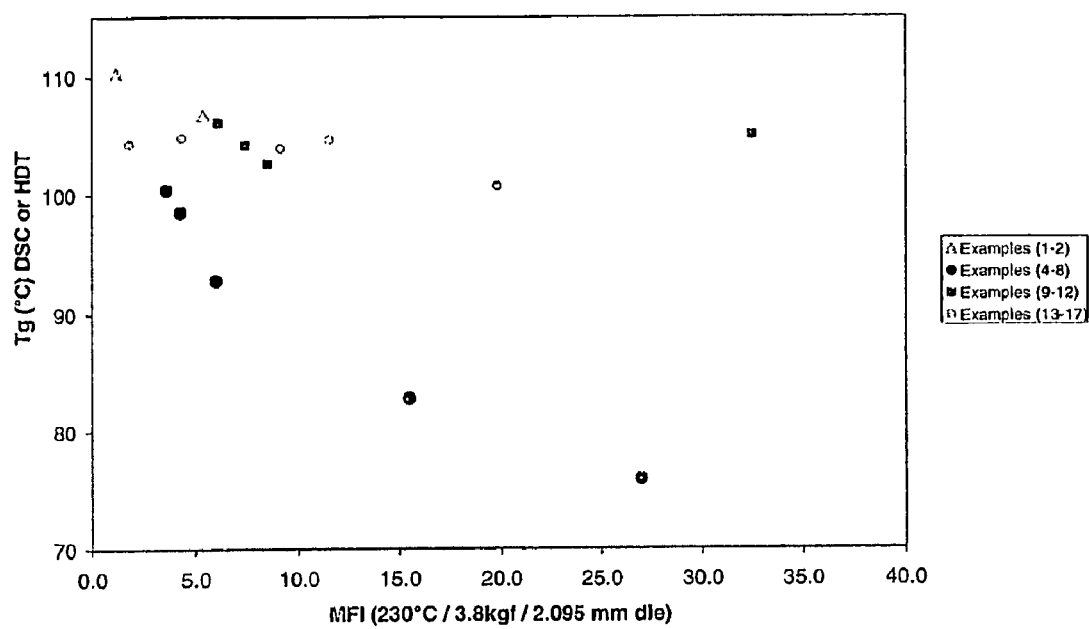

The MFI and Tg values for these examples were measured and the results are shown in FIG. 4. As can be seen the Tg level of the high/low MW blended polymers are markedly higher than the copolymers for a corresponding MFI improvement.

FIG. 4: Plot of MFI vs Tg for polymers listed in examples above. The Tg values were measured by DSC or HDT (see information in examples for details)

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An acrylic polymeric composition comprising a melt blend of a thermoplastic high molecular weight acrylic material (HMWA) and a thermoplastic low molecular weight acrylic material (LMWA), at least 70% w/w, based on the total weight of the HMWA, of the said HMWA comprising an alkyl(alk)acrylate (co)polymer, the said (co)polymer comprising at least 80% w/w of a first polymer unit derived from $C_1$-$C_{12}$ alkyl ($C_1$-$C_8$ alk)acrylate monomer units and optionally, up to 20% w/w, based on the said alkyl(alk)acrylate (co)polymer of a first copolymer unit derived from $C_1$-$C_{12}$ alkyl ($C_0$-$C_8$ alk) acrylate and/or ($C_0$-$C_8$ alk) acrylic acid monomer units, the said HMWA having a weight average molecular weight of between 40 k Daltons and 1000 k Daltons, at least 70% w/w, based on the total weight of the LMWA, of the said LMWA comprising an alkyl(alk)acrylate (co)polymer, the said (co)polymer comprising at least 80% w/w of a second polymer unit derived from $C_1$-$C_{12}$ alkyl ($C_1$-$C_8$ alk)acrylate monomer units and optionally, up to 20% w/w, based on the said alkyl(alk)acrylate (co)polymer of a second copolymer unit derived from $C_1$-$C_{12}$ alkyl ($C_0$-$C_8$ alk)acrylate and/or ($C_0$-$C_8$ alk)acrylic acid monomer units, the said LMWA having a weight average molecular weight of between the entanglement molecular weight ($M_e$) (expressed in k Daltons) and 250 k Daltons, with the proviso that the HMWA has a higher $M_w$ than the LMWA, wherein the first polymer unit of the HMWA and the second polymer unit of the LMWA are the same, and wherein the composition has less than 0.5% w/w of impact strength modifier.

2. An acrylic composition comprising
   a. an acrylic polymeric composition according to claim 1; and
   b. a suitable solvent.

3. The composition of claim 1, wherein there is a first copolymer unit and a second copolymer unit and wherein the first copolymer unit and the second copolymer unit are the same.

4. The composition of claim 1, wherein the weight ratio of HMWA:LMWA in the composition is greater than 1:1.

5. The composition, of claim 1, wherein the acrylic polymeric composition comprises, based on the weight of the acrylic polymeric composition, up to 55% w/w of LMWA and at least 40% w/w of HMWA.

6. The composition of claim 1, wherein the melt blend is a homogeneous melt blend.

7. The composition of claim 1, wherein the composition includes a second or further HMWA component, defined in the same manner as the first HMWA component, but having a third or further polymer unit and optionally a third or further copolymer unit, which has a weight average molecular weight greater than the LMWA but which is less or greater than the first HMWA component(s).

8. The composition of claim 1, wherein the LMWA has a weight average molecular weight ($M_w$) in excess of 11 k Daltons.

9. An acrylic polymer composition according to claim 1 wherein the HMWA and the LMWA together form more than 80% w/w of the acrylic polymer composition.

10. An acrylic polymer composition according to claim 1, wherein the HMWA and the LMWA together form at least 95% w/w of the acrylic polymeric composition.

11. The composition according to claim 1 wherein the composition has less than 0.1% w/w of impact strength modifier.

12. The composition according to claim 1, wherein the HMWA and LMWA have been produced by bulk, emulsion or suspension polymerisation.

13. The composition according to claim 1, wherein the HMWA and the LMWA are single phase polymers.

14. The acrylic composition of claim 2, wherein the solvent (b):polymer (a) ratio w/w is between 10:90 and 60:40.

15. An acrylic composition according to claim 2, wherein the HMWA and the LMWA together form more than 80% w/w of the acrylic polymeric composition.

16. An acrylic composition according to claim 2, wherein the HMWA and the LMWA together form at least 95% of the acrylic polymeric composition.

17. The composition according to claim 2, wherein the HMWA and LMWA have been produced by bulk, emulsion or suspension polymerisation.

18. The composition according to claim 2, wherein there is a first copolymer unit and a second copolymer unit and wherein the first copolymer unit and the second copolymer unit are the same.

19. The composition according to claim 2, wherein the HMWA and the LMWA are single phase polymers.

20. The composition of claim 3, wherein the weight ratio of the first polymer unit: first copolymer unit is within ±30% of the ratio of second polymer unit: second copolymer unit.

21. The composition of claim 7, wherein the second or further HMWA component is present at a level, based on the acrylic polymeric composition, of at least 5% w/w.

22. The composition of claim 7, wherein the first polymer unit of the HMWA and the third or further polymer unit of the second or further HMWA are the same.

23. The composition of claim 7, having a first copolymer unit and third copolymer unit, wherein the first copolymer unit and third copolymer unit are the same.

24. The composition of claim 7, wherein the ratio of the first polymer unit: first copolymer unit is within ±30% of the ratio of the third polymer unit: third copolymer unit.

25. A method of producing the acrylic polymeric composition of claim 1 comprising the steps of:—
   a) contacting a thermoplastic high molecular weight acrylic material (HMWA) with a thermoplastic low molecular weight acrylic material (LMWA); and
   b) mixing the said HMWA and LMWA at an elevated temperature until a melt blend is produced;
   wherein the said elevated temperature is above the glass transition temperature of both the HMWA and LMWA.

26. The method of claim 25, wherein the HMWA and LMWA have been produced by bulk, emulsion or suspension polymerisation.

27. The method of claim 25, wherein there is a first copolymer unit and a second copolymer unit and wherein the first copolymer unit and the second copolymer unit are the same.

28. The method of claim 25, wherein the HMWA and the LMWA are single phase polymers.

29. A method of producing a higher melt flow index melt blended composition or moulded polymer product (as compared with the HMWA not blended with the LMWA) by use of an acrylic polymeric composition in accordance with claim 1.

30. The method of claim 29, wherein the HMWA and LMWA have been produced by bulk, emulsion or suspension polymerisation.

31. The method of claim 29, wherein there is a first copolymer unit and a second copolymer unit and wherein the first copolymer unit and the second copolymer unit are the same.

32. The method of claim 29, wherein the HMWA and the LMWA are single phase polymers.

33. A method of providing a melt blended composition or moulded polymer product having a $T_g$ in the range of 80-110° C. by use of an acrylic composition as claimed in claim 1.

34. The method of claim 33, wherein the HMWA and LMWA have been produced by bulk, emulsion or suspension polymerisation.

35. The method of claim 33, wherein there is a first copolymer unit and a second copolymer unit and wherein the first copolymer unit and the second copolymer unit are the same.

36. The method of claim 33, wherein the HMWA and the LMWA are single phase polymers.

37. A thick section mould of the composition according to claim 1.

38. The thick section mould according to claim 37, wherein the HMWA and LMWA have been produced by bulk, emulsion or suspension polymerisation.

39. The thick section mould according to claim 37, wherein there is a first copolymer unit and a second copolymer unit and wherein the first copolymer unit and the second copolymer unit are the same.

40. The thick section mould according to claim 37, wherein the HMWA and the LMWA are single phase polymers.

41. A moulded polymer product comprising an acrylic polymeric composition according to claim 1.

42. A moulded polymer product according to claim 41, wherein the HMWA and LMWA have been produced by bulk, emulsion or suspension polymerisation.

43. A moulded polymer product according to claim 41, wherein there is a first copolymer unit and a second copolymer unit and wherein the first copolymer unit and the second copolymer unit are the same.

44. A moulded polymer product according to claim 41, wherein the HMWA and the LMWA are single phase polymers.

45. A process for reducing cycle time of a moulding composition comprising the step of:
    injection moulding or extrusion moulding a composition according to claim 1 wherein the cycle time is reduced compared to a comparative copolymer which is derived from the same monomer units as said HMWA or LMWA, but where the ratio of monomer units is adjusted such that said comparative copolymer has the same MFI as said melt blend.

46. A process for reducing cycle time according to claim 45, wherein the HMWA and LMWA have been produced by bulk, emulsion or suspension polymerisation.

47. A process for reducing cycle time according to claim 45, wherein there is a first copolymer unit and a second copolymer unit and wherein the first copolymer unit and the second copolymer unit are the same.

48. A process for reducing cycle time according to claim 45, wherein the HMWA and the LMWA are single phase polymers.

49. A process for reducing cooling cycle times of a moulding composition comprising the step of:
    injection moulding or extrusion moulding a composition according to claim 1 wherein the cooling cycle time is reduced compared to a comparative copolymer which is derived from the same monomer units as said HMWA or LMWA, but where the ratio of monomer units is adjusted such that said comparative copolymer has the same MFI as said melt blend the HMWA.

50. A process for reducing cooling cycle times according to claim 49, wherein the HMWA and LMWA have been produced by bulk, emulsion or suspension polymerisation.

51. A process for reducing cooling cycle times according to claim 49, wherein there is a first copolymer unit and a second copolymer unit and wherein the first copolymer unit and the second copolymer unit are the same.

52. A process for reducing cooling cycle times according to claim 49, wherein the HMWA and the LMWA are single phase polymers.

* * * * *